US008953938B2

(12) United States Patent
Mitra et al.

(10) Patent No.: US 8,953,938 B2
(45) Date of Patent: Feb. 10, 2015

(54) TIME SCALE SEPARATED NETWORK MANAGEMENT AND NETWORK PROVISIONING OPTIMIZATIONS

(75) Inventors: Debasis Mitra, Summit, NJ (US); Qiong Wang, Millington, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 2311 days.

(21) Appl. No.: 11/679,515

(22) Filed: Feb. 27, 2007

(65) Prior Publication Data

US 2008/0205293 A1 Aug. 28, 2008

(51) Int. Cl.
*H04Q 11/00* (2006.01)
*H04L 12/24* (2006.01)

(52) U.S. Cl.
CPC ............................. *H04L 41/0806* (2013.01)
USPC ........................................................... 398/46

(58) Field of Classification Search
USPC ............ 398/43, 45, 50, 57, 59; 370/254, 222, 370/238, 258; 709/220, 222
See application file for complete search history.

(56) References Cited

U.S. PATENT DOCUMENTS

| 7,170,851 | B1 * | 1/2007 | Chen et al. ..................... 370/222 |
| 7,171,124 | B2 * | 1/2007 | Smith et al. ....................... 398/97 |
| 2004/0062195 | A1 * | 4/2004 | Mishra et al. .................. 370/217 |
| 2005/0147081 | A1 | 7/2005 | Acharya et al. |
| 2007/0019955 | A1 | 1/2007 | Mitra et al. |
| 2007/0118643 | A1 * | 5/2007 | Mishra et al. .................. 709/224 |

FOREIGN PATENT DOCUMENTS

WO PCTUS2008002532 11/2008

OTHER PUBLICATIONS

Chan M.C., Customer Management and Control of Broadband VPN Services, Center for Telecommunications Research Columbia University, New York, NY 10027, p. 1-14.*
Geoffrion, Generalized Benders Decomposition, Nov. 4, 1972, Plenum Publishing Corporation, Journal of Optimization theory and Applications, vol. 10, pp. 237-260.*
Wissam Fawaz, Service Level agreement and Provisioning in optical Networks, Jan. 2004, IEEE Communications Magazine, p. 36-43.*
G. Codato et al., "Combinatorial Benders' Cuts for Mixed-Integer Linear Programming", Operations Research, vol. 54, No. 4, Jul.-Aug. 2006.*

(Continued)

*Primary Examiner* — Shi K Li
(74) *Attorney, Agent, or Firm* — Ryan, Mason & Lewis, LLP

(57) ABSTRACT

A communication network is configured to implement time scale separated management and provisioning optimizations, for example, in a core optical network coupled to multiple data networks. Network management optimizations are performed at respective points in time separated by intervals of a first time scale, and network provisioning optimizations are performed at respective points in time separated by intervals of a second time scale, with the intervals of the second time scale being on average substantially longer than the intervals of the first time scale. Moreover, at least a given one of the intervals of the second time scale has a length which is determined based on results of performance of one or more of the network management optimizations. The core optical network may be configured utilizing information specified by the network management and network provisioning optimizations.

27 Claims, 2 Drawing Sheets

(56) References Cited

OTHER PUBLICATIONS

A. Elwalid et al., "Distributed Nonlinear Integer Optimization for Data-Optical Internetworking," IEEE Journal on Selected Areas in Communications, Aug. 2006, pp. 1502-1513, vol. 24, No. 8.

A.M. Geoffrion, "Generalized Benders Decomposition," Journal of Optimization Theory and Applications, Oct. 1972, pp. 237-260, vol. 10, No. 4.

A. Gersht et al., "Real-Time Bandwidth Allocation and Path Restorations in Sonet-Based Self-Healing Mesh Networks," Proceedings of the International Conference on Communications (ICC), May 1993, pp. 250-255, vol. 1.

S. Lee et al., "Contention-based Limited Deflection Routing in OBS Networks," IEEE Global Telecommunications Conference, Globecom, Dec. 2003, pp. 2633-2637.

\* cited by examiner

TIME SCALE SEPARATED NETWORK MANAGEMENT AND NETWORK PROVISIONING OPTIMIZATIONS

FIELD OF THE INVENTION

The present invention relates generally to optical networks or other types of communication networks, and more particularly to techniques for performing management and provisioning optimizations in such networks.

BACKGROUND OF THE INVENTION

Communication networks may comprise core optical networks which include multiple optical switching nodes. In such networks, optimizations associated with network management and network provisioning are conventionally performed. Network management optimizations may include, for example, optimizations of network parameters associated with routing and admission control. Network provisioning optimizations may involve, for example, determining optimal sizes of lightpaths within the core optical network, possibly for virtual networks with pre-designed topology.

A need exists for an improved approach to performance of management and provisioning optimizations in communication networks.

SUMMARY OF THE INVENTION

The present invention in a number of illustrative embodiments provides a time scale separated approach to performance of network management and provisioning optimizations in a communication network. The resulting unification of network management and network provisioning allows the network to be made more readily adaptive to traffic changes, in an efficient and cost-effective manner.

In accordance with one aspect of the invention, network management optimizations are performed at respective points in time separated by intervals of a first time scale, and network provisioning optimizations are performed at respective points in time separated by intervals of a second time scale, with the intervals of the second time scale being on average substantially longer than the intervals of the first time scale. Moreover, at least a given one of the intervals of the second time scale has a length which is determined based on results of performance of one or more of the network management optimizations. Information specified by the network management and network provisioning optimizations, which may include various network parameters, is utilized to configure the network. The network may comprise, for example, a core optical network of a communication network that includes multiple data networks coupled to the core optical network.

In an illustrative embodiment, the intervals of the first time scale may comprise fixed length time intervals, and the intervals of the second time scale may comprise variable length time intervals having lengths which are determined based on shadow costs or other outputs generated by the network management optimizations. Such shadow costs may comprise, for example, marginal values associated with optical lightpath sizes.

The network management optimizations may be performed at respective points in time denoted by a first index, and the network provisioning optimizations may be performed at respective points in time denoted by a second index. The first index of the points at which network management optimizations are performed may be reset to an initial value at each point denoted by a value of the second index at which a network provisioning optimization is performed.

Also, the network management optimization performed at a given point denoted by an initial value of the first index may be performed jointly with the network provisioning optimization performed at a corresponding point denoted by a value of the second index. One example of such a joint network management optimization and network provisioning optimization receives as input a set of traffic demands, and optimizes an objective function given by a maximum difference in a common measurement system between utility of carrying traffic and wavelength cost, generating as outputs values for number of wavelengths on each of a plurality of paths of the network, amount of traffic carried on each of a plurality of routes of the network, and shadow costs for each of the paths.

An example of the network management optimization performed at a point denoted by a non-initial value of the first index receives as input a set of traffic demands, and maximizes the utility of carrying traffic subject to a constraint given by the number of wavelengths on each of the paths, generating as outputs values for amount of traffic carried on each of the routes, and shadow costs for each of the paths.

A trigger decision as to whether or not a network provisioning optimization is to be performed is made based on shadow costs or other measures as determined in one or more of the network management optimizations. With reference to the above-noted illustrative embodiment, if the trigger decision indicates that a network provisioning optimization is to be performed, the first index is reset to the initial value, the second index is incremented, and the network provisioning optimization is performed jointly with the network management optimization.

The network management optimization and network provisioning optimization may comprise, for example, solutions to respective slave and master problems derived from a single optimization model. The optimization model may incorporate, for example, a measure of utility of carrying traffic and a measure of wavelength cost, and may be subject to a constraint on maximum number of wavelengths on each of a plurality of links in the network.

Advantageously, the time scale separated approach to performance of network management and provisioning optimizations in the illustrative embodiments can provide significantly improved performance in a core optical network or other type of network.

These and other features and advantages of the present invention will become more apparent from the accompanying drawings and the following detailed description.

DETAILED DESCRIPTION OF THE INVENTION

The present invention will be illustrated below in conjunction with exemplary communication networks and associated time scale separated management and provisioning optimization techniques. It should be understood, however, that the invention is not limited to use with any particular type of communication network or time scale separation of management and provisioning optimizations. The disclosed techniques are suitable for use with a wide variety of other network configurations and associated network management and network provisioning optimization arrangements.

One possible approach to performance of network management and network provisioning optimizations is to perform such optimizations as either as a single joint optimization or as entirely separate and independent optimizations. However, in both cases it is difficult to determine an appropriate time to perform such optimizations, particularly in the presence of dynamic traffic demands. Performing the network provisioning optimization too frequently can consume excessive processing resources and reduce traffic throughput. On the other hand, failure to perform network provisioning optimization on a sufficiently frequent basis can result in prolonged maintenance of a suboptimal network configuration, again adversely impacting network throughput. The illustrative embodiments to be described below balance network management optimization and network provisioning optimization in a way that can lead to improved performance.

The term "optimization" as used herein is intended to be construed broadly, so as not to require, for example, an actual maximum or minimum for a given objective function. Thus, an optimization may involve an approximation of such a condition, or termination of a solution process prior to achievement of an actual maximum or minimum.

Figure 1:
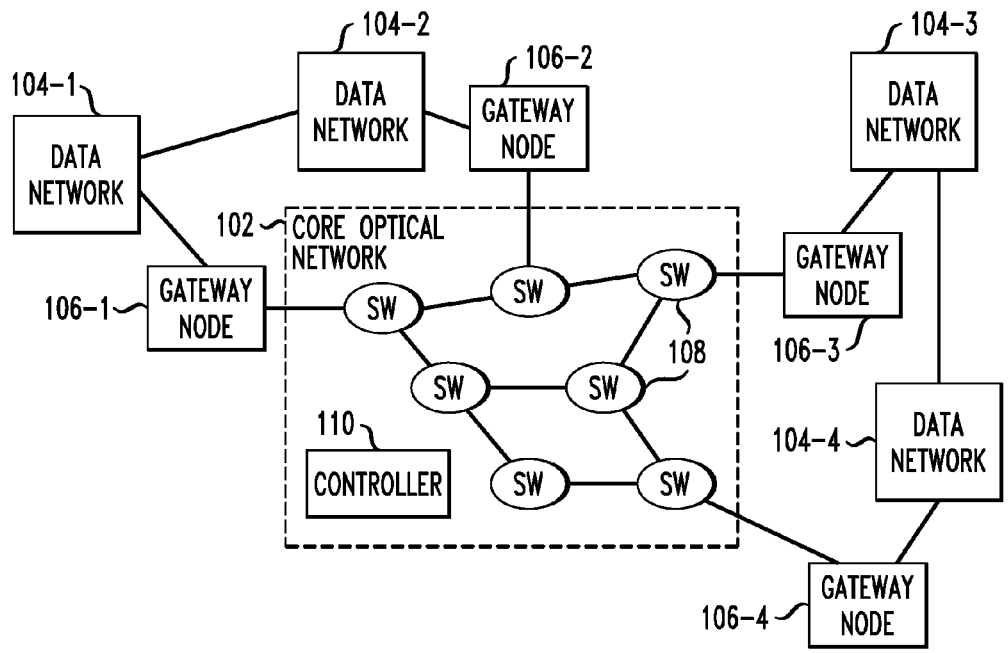
FIG. 1 is a simplified diagram of a communication network in an illustrative embodiment of the invention.

FIG. 1 shows a communication network 100 in an illustrative embodiment of the invention. The communication network 100 comprises an core optical network 102 that is coupled to data networks 104-1, 104-2, 104-3 and 104-4 via respective gateway nodes 106-1, 106-2, 106-3 and 106-4 as shown. Each of the data networks 104 may comprise multiple nodes, and may be configured in accordance with a data networking protocol such as Internet protocol (IP). This type of architecture is commonly referred to as an IP-over-Optical (IPO) architecture, and may utilize standard control-plane protocols, such as generalized multiprotocol label switching (GMPLS), which include user-network interfaces (UNIs) for enabling signaling and information exchange between the IP and optical domains.

Additional details regarding the operation of IPO architectures and other types of communication networks may be found in, for example, A. Elwalid et al., "Distributed Nonlinear Integer Optimization for Data-Optical Internetworking," IEEE J. Selected Areas in Communications, Vol. 24, No. 8, pp. 1502-1513, August 2006, and U.S. patent application Ser. No. 11/187,056, filed Jul. 23, 2005 and entitled "Hybrid Optical and Data Networks," both of which are incorporated by reference herein.

It should be noted that the communication network 100 of FIG. 1 is simplified for purposes of illustration. The invention is well-suited for use in large-scale regional, national and international networks which may include many subnetworks, each having hundreds of nodes.

The core optical network 102, also referred to herein as simply the "optical core," comprises multiple optical switching nodes 108 having an associated controller 110. The controller 110 is configured to perform periodic network management and network provisioning optimizations on the core optical network using separated time scales, as will be further described herein in conjunction with FIGS. 3 and 4. The controller may be a centralized controller that is coupled to each of the optical switching nodes 108, although such interconnections are omitted from FIG. 1 for simplicity and clarity of illustration. As another example, the controller as shown in the figure may be viewed as representing a distributed controller that is distributed across the optical switching nodes, such that a portion of the controller functionality is replicated in each of the optical switching nodes. Other possible alternatives include hybrid arrangements in which certain portions of the controller are centralized and others are distributed. The present invention can be implemented using any of these controller configurations, or other suitable controller configurations that will be apparent to those skilled in the art.

The optical switching nodes 108 of the core optical network 102 may be assumed without limitation to be interconnected by physical links. This interconnection of nodes and links defines the physical topology of the core optical network. A network provisioning optimization may be viewed as defining what is referred to herein as a "virtual topology" of the core optical network, for example, by specifying a mapping of physical links to paths between the gateways via the core optical network. Routing associated with network management optimization may be based, for example, on a mapping of paths to routes in the core optical network. Additional details regarding exemplary mappings may be found in the above-cited U.S. patent application Ser. No. 11/187,056. Other types of mappings or virtual topology assumptions may be used in implementing the invention.

Figure 2:
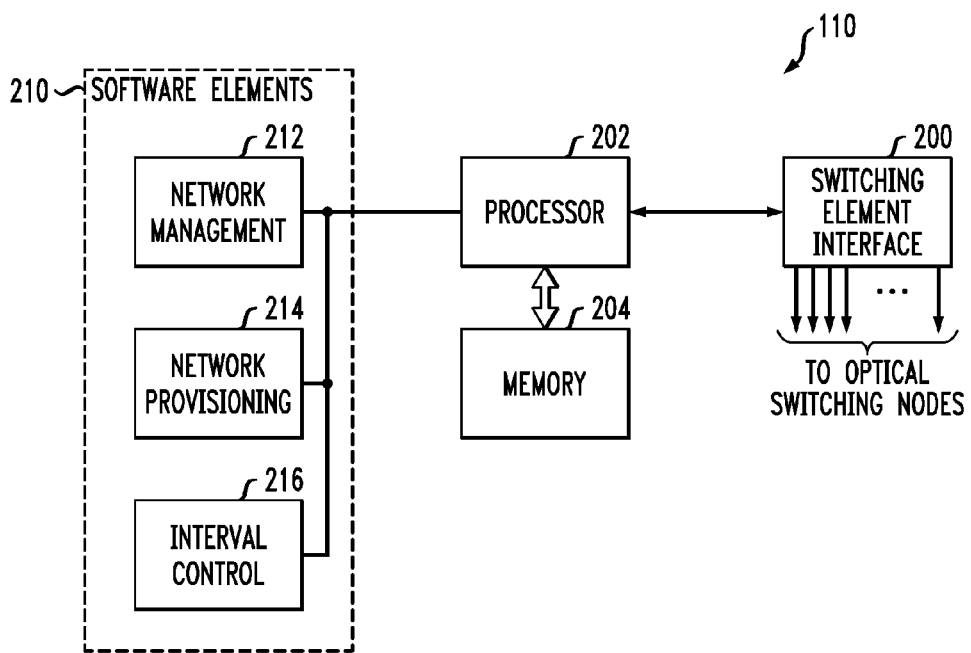
FIG. 2 is a block diagram showing one possible configuration of a core optical network controller in the communication network of FIG. 1.

FIG. 2 shows a more detailed view of one possible implementation of the controller 110 in the core optical network 102. In this embodiment, the controller is assumed to be a centralized controller that interfaces with the optical switching nodes 108 via a switching element interface 200. The controller includes a processor 202 and a memory 204. These elements are utilized to store and execute one or more software elements 210, which in this embodiment comprise a network management element 212, a network provisioning element 214, and an interval control element 216. These elements may be implemented, for example, as one or more software programs that are stored in memory 204 and executed by processor 202. In other embodiments, such elements may be implemented using any desired combination of software, firmware and hardware.

The processor 202 may comprise, for example, a microprocessor, a microcontroller, an application-specific integrated circuit (ASIC) or other type of processing device, as well as portions or combinations of such devices. The memory 204 may comprise an electronic random access memory (RAM), a read-only memory (ROM) or other type of storage device, as well as portions or combinations of such devices. In addition to storing software programs of the type noted above, the memory 202 may be used to store information such as, for example, a demand database for storing demands for network capacity, and a set of routing tables which specify routes through the network.

In other embodiments, the controller 110 may be implemented as a general-purpose computer, a server, a workstation or other type of computer that is not necessarily co-located with any particular portion of the core optical network. For example, the network management and network provisioning optimizations may be performed at a remote site relative to the core optical network, and appropriate network configuration changes that are based on the optimizations may be communicated to the network nodes via control channels or other transmission media.

The network management element 212 and network provisioning element 214 are configured to perform respective network management and network provisioning optimizations. More specifically, the network management element performs network management optimizations at respective points in time separated by intervals of a first time scale, and the network provisioning element performs network provisioning optimizations at respective points in time separated by intervals of a second time scale. The network management optimizations may comprise, for example, at least one of a routing optimization and an admission control optimization. The network provisioning optimizations may comprise, for example, optical lightpath sizing and resizing optimizations. In other embodiments, other types of network management and provisioning optimizations may be performed.

The interval control element 216 determines the first time scale intervals between the points at which network management optimizations are performed by element 212 and the second time scale intervals between points at which network provisioning optimizations are performed by element 214.

The term "interval" as used herein is intended to be broadly construed. Thus, intervals may be measured, for example, between initialization points of respective instances of the optimizations, between the completion point of one instance of an optimization to the initialization point of the next instance of the optimization, or using any of a variety of other techniques. Thus, an interval may include at least a portion of the performance time of a given optimization. It is to be appreciated that references to performing optimizations at respective points in time separated by intervals may comprise, for example, just initiating the optimizations at the respective points, and completing the optimizations at some time after their corresponding initializations. The terms "performance" and "performing" with regard to optimizations herein should therefore not be construed as requiring completion of the optimizations at any particular time. As another example, the complete performance times from initialization to completion of respective optimizations may be approximated as corresponding to points in time, relative to time scale intervals that may be substantially longer than the complete performance times associated with the optimizations.

The intervals of the second time scale are on average substantially longer than the intervals of the first time scale. Moreover, the lengths of the intervals of the second time scale are determined based on results of performance of one or more of the network management optimizations. In the illustrative embodiments, designated outputs of the network management optimizations are monitored and used to trigger performance of a given network provisioning optimization.

The notion of the intervals of the second time scale being "on average" longer than the intervals of the first time scale contemplates situations in which all of the intervals of the second time scale are not necessarily longer than all of the intervals of the first time scale. For example, it may be appropriate in some circumstances to rapidly perform multiple provisioning optimizations in a relatively short time frame due to drastic changes in network conditions. However, for a certain period of operation, the intervals of the second time scale if averaged over the period will tend to be substantially longer, for example, two to ten times as long, as the average of the intervals of the first time scale over the same period. Of course, the particular ratio of the average length of the intervals of the second time scale to the average length of the intervals of the first time scale over a certain period of operation in a given implementation will depend upon factors such as the nature of the traffic during that time period. For example, if the traffic characteristics change very slowly, the ratio may be very large. The ratio will generally be greater than one, and may be much greater than ten. It should be noted that the recitation "on average" is intended to be construed broadly, and should not be interpreted to mean that the controller or any other network element necessarily computes such an average.

Subsequent to the performance of at least a given network management optimization or network provisioning optimization, the network is configured utilizing information specified by the optimization(s). For example, one or more network parameters may be adjusted to implement any changes indicated by the optimization(s).

Figure 3:
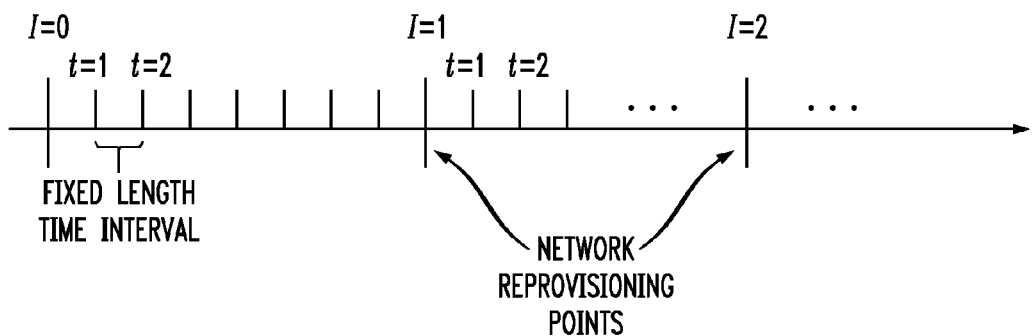
FIG. 3 is a timing diagram of a time scale separated approach to performance of network management and provisioning optimizations in an illustrative embodiment.

Referring now to the timing diagram of FIG. 3, the network management optimizations in this example are performed at respective points in time denoted by t=0, 1, 2, . . . , which are separated by fixed length time intervals of the first time scale. The network provisioning optimizations are performed at respective points in time denoted I=0, 1, 2, . . . , which are separated by variable length intervals of the second time scale. The points at which the network provisioning optimizations are performed are also referred to as network reprovisioning points in the figure, and are triggered based on results of the network management optimizations, as will be described in greater detail below. It can also be seen that the index t of the points at which network management optimizations are performed is reset to zero at each point I at which a network provisioning optimization is performed. A given network management optimization point is therefore indexed (t, I) for t=0, 1, 2, . . . , and the initial point (0, I) corresponds to a point at which both a network management optimization and a network provisioning optimization are performed.

Thus, in the illustrative embodiment of FIG. 3, the performance of the network provisioning optimization is triggered based on results obtained by performance of the network management optimization(s). Accordingly, the network provisioning optimizations are performed on a relatively slow time scale, that is, with relatively long intervals between performance points, as determined based on results of the network management optimization(s), and during each of these long intervals the network management optimization is typically performed many times. Such an approach is advantageous in that it better balances the network management and provisioning optimizations, thereby providing improved network performance in the presence of dynamic traffic demands.

The particular first and second time scales shown in the FIG. 3 embodiment are not intended to limit the scope of the invention in any way. For example, in other embodiments, the intervals of the first time scale need not be fixed length intervals as shown in FIG. 3, but could instead be variable length intervals.

Figure 4:
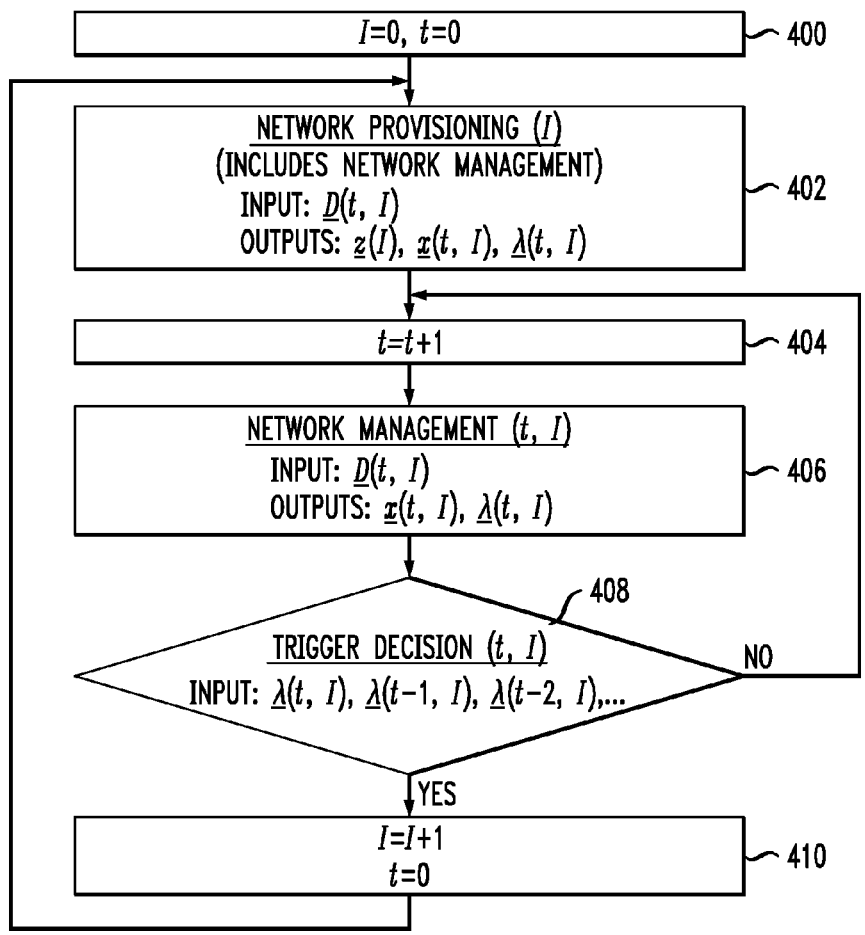
FIG. 4 is a flow diagram illustrating in greater detail the performance of the time scale separated network management and provisioning optimizations shown in FIG. 3.

The flow diagram of FIG. 4 illustrates in greater detail the manner in which network management and provisioning optimizations are performed in accordance with the separated time scales shown in FIG. 3.

In step 400, the above-described indices I and t are set to zero.

In step 402, network management and network provisioning optimizations are performed jointly. For example, given as input a set of traffic demands (D), and assuming knowledge of the physical network topology and the incremental cost of wavelength on each path, the joint optimization process may optimize an objective function given by the maximum difference between the utility of carrying traffic and the wavelength cost. The outputs of such a joint optimization process in the present example may comprise optimal values for the number (z) of wavelengths on each path, the amount (x) of traffic carried on each route, and shadow costs ($\lambda$) for each path. In the context of the FIG. 4 embodiment, the underscore associated with a given variable denotes a vector or matrix of values. Alternative notation may be used to denote vectors elsewhere herein.

The shadow costs may comprise, for example, marginal values associated with optical lightpath sizes, as perceived and computed by traffic management functions. Other types of costs or measures may be used in other embodiments.

In step 404, the index t for performance of network management optimization is incremented.

In step 406, network management optimizations are performed for one or more non-zero values of the index t for a given value of the index I. As indicated previously in conjunction with FIG. 3, these network management optimizations are performed at points separated by fixed length intervals. The network capacity in terms of number (z) of wavelengths on each path is assumed to be fixed at the optimal value previously determined for the given value of the index I in step 402. The input is a set of traffic demands (D) for a particular non-zero value of the index t, and the corresponding network management optimization maximizes the utility of carrying traffic, subject to the above-noted capacity constraint (z). The outputs of this optimization include optimal values for the amount (x) of traffic carried on each route, and shadow costs ($\lambda$) for each path.

In step 408, a decision is made as to whether or not a network provisioning optimization is to be performed. This trigger decision is based on the shadow costs ($\lambda$) as determined in the previous iteration(s) of the network management optimization in step 406 for one or more non-zero values of the index t corresponding to a given value of the index I. For example, the shadow costs may be monitored relative to a threshold. If systematic and significant changes in the shadow costs become evident, by such costs exceeding the established threshold, the index I is incremented in step 410, and the process returns to step 402 to perform another joint network management and network provisioning optimization. Otherwise, the process returns to step 404, where the index t is incremented, and step 406 is repeated for the new non-zero value of t within the interval corresponding to the given value of index I.

It should be noted that the trigger decision in step 408 may "look back" from (t, I) to iterations associated with previous values of the index I, possible as far back as (0,0).

The interval control element 216 of controller 110 determines appropriate intervals for performance of the network management and network provisioning optimizations. For example, this element establishes the fixed length intervals for performance of the network management optimizations, and monitors the output shadow costs to determine the variable intervals for the performance of the network provisioning optimizations. Thus, this element may implement steps 400, 404, 408 and 410 of the FIG. 4 process, while steps 402 and 406 are implemented by elements 212 and 214 of controller 110. As indicated previously, numerous alternative controller configurations may be used, utilizing any desired combination of software, firmware or hardware.

It is to be appreciated that the particular optimizations referred to above, and their associated inputs, outputs and operating assumptions, are presented by way of illustrative example only. For example, in other embodiments, different types of cost measures, or more generally other types of measures, may be used in place of the shadow costs in making the trigger decision regarding performance of a network provisioning optimization.

A more detailed example of network management and network provisioning optimizations that may be used in the embodiment of FIGS. 3 and 4 will now be described with reference to a particular basic optimization model. Again, this model and the corresponding optimizations should not be viewed as limitations of the invention. Those skilled in the art will recognize that numerous alternative optimization arrangements may be used.

In this example, a global optimization problem is defined that combines optical lightpath sizing, traffic routing and admission control. The global optimization problem incorporates: (a) a utility function, which may be nonlinear, representing the value of carrying traffic; and (b) the cost of resources in the optical core, which is based on the number of wavelengths deployed in each link of the virtual topology. The optimization is therefore a nonlinear integer programming problem; the integrality is a consequence of the wavelength being an indivisible resource unit. Also included in the formulation is a constraint on the maximum number of wavelengths used in each link, which reflects the fixed number of wavelengths in a fiber and the possible use of more than one fiber on a link. It should be noted that the invention does not require the use of an integer programming problem. Moreover, such a problem may be solved by using approximate approaches based on relaxation of one or more constraints, as will be appreciated by those skilled in the art.

Assumptions associated with the basic model include availability of a traffic demand matrix, and the availability of admissible routes for each source-destination node pair in the virtual topology. However, these and other assumptions made herein in describing the illustrative embodiments should not be viewed as limitations of the invention.

Decomposition of the numerical optimization procedure gives a master and a slave optimization problem, the solutions for which respectively map into network provisioning and management optimizations. This separates the long term, more costly network provisioning optimization from short term, less expensive network management optimization, and uses the outcome from the latter as feedback to modify the former.

The decomposition makes use of Generalized Bender's Decomposition, although other solution methods can be used. Additional description regarding Generalized Bender's Decomposition can be found in, for example, A. Schrijver, "Theory of Linear and Integer Programming," New York, Wiley, 1998, and A. M. Geoffrion, "Generalized Benders Decomposition," J. Optim. Theory Appl., Vol. 10, pp. 237-260, 1972, which are incorporated by reference herein.

The basic model used in the global optimization problem will now be described. Given traffic demands, the problem is to optimize both network provisioning, by choosing the right numbers of wavelengths, and network management, by routing and admission control. The problem may be formulated as $$\max_{\vec{z},\vec{w},\vec{x}} \left[ U(\vec{w}) - \sum_{p \in P} c_p z_p \right] \tag{1}$$

subject to $$\sum_{r \in R(\xi)} x_r = w_\xi (\xi \in S) \tag{2}$$

$$\sum_{r \in R: p \in r} x_r \leq b z_p \, \forall \, p \in P \tag{3}$$

$$w_\xi \leq D_\xi \text{ and } \vec{z} \text{ integral} \tag{4}$$

$$\sum_{p \in P: l \in p} z_p \le f_l, \forall l \in L. \quad (5)$$

where the definitions of the symbols are as follows:

P: the set of potential paths. Each path is a link or a concatenation of links in the virtual topology.

L: the set of physical links.

S: the set of node pairs in the virtual topology.

$R(\xi)$: the set of admissible routes between node pair $\xi$.
$R = \cup_{\xi \in S} R(\xi)$.

$z_p$: integers, the number of wavelengths deployed on path p.

$w_\xi$: the amount of carried demand between node pair $\xi$.

$x_r$: the amount of traffic carried on route $r \in R(\xi)$ for node pair $\xi$.

$c_p$: the cost of deploying an additional wavelength on path p.

b: bandwidth per wavelength.

$f_l$: the maximum number of wavelengths that can be used on physical link l.

$D_\xi$: offered demand between node pair $\xi$, $D_\xi$ can be infinity.

$U(\vec{w})$: utility as a function of carried demand.

The optimization problem (1) may be decomposed as follows:

$$\max_{\vec{z}, \vec{w}, \vec{x}} \left\{ U(\vec{w}) - \sum_{p \in P} c_p z_p \Big| \sum_{r \in R: p \in r} x_r \le b z_p, \quad (6) \right.$$

$$\left. \sum_{r \in R(\xi)} x_r = w_\xi \le D_\xi, \sum_{p \in P: l \in p} z_p \le f_l, \forall l \in L \right\} =$$

$$\max_{\vec{z}} \left[ \max_{\vec{x}, \vec{w}} \left\{ U(\vec{w}) \Big| \sum_{r \in R: p \in r} x_r \le b z_p, \sum_{r \in R(\xi)} x_r = w_\xi \right\} - \right.$$

$$\left. \sum_{p \in P} c_p z_p \Big| \sum_{p \in P: l \in p} z_p \le f_l, \forall l \in L \right]$$

$$\max_{\vec{z}} \left\{ G(\vec{z}) - \sum_{p \in P} c_p z_p \Big| \sum_{p \in P: l \in p} z_p \le f_l, \forall l \in L \right\}. \quad (7)$$

The outer and inner optimization problems in (6) are respectively referred as the master and slave problems and have the following intuitive interpretations.

The slave problem $$G(\vec{z}) = \max_{\vec{x}, \vec{w}} [U(\vec{w}) | \text{ subject to constraints (2), (3), and (4)}] \quad (8)$$

optimizes routing and admission control ($\vec{x}, \vec{w}$) for the given configuration ($\vec{z}$), where the objective is to maximize the utility $U(\vec{w})$. This is the network management problem addressed by the basic model.

The master problem $$\max_{\vec{z}} \left[ G(\vec{z}) - \sum_{p \in P} c_p z_p \Big| \sum_{p \in P: l \in p} z_p \le f_l, \forall l \in L, z \text{ integral} \right] \quad (9)$$

yields the number of wavelengths $z_p$ on each optical path p which maximizes the "surplus" of the utility over the wavelength deployment costs. This is the network provisioning problem. It takes into account the impact of provisioning on the outcome of the optimal network management as reflected by the function $G(\vec{z})$.

The basic model described above optimizes the network performance for given traffic demands. As demands change over time, the decisions should also evolve, which necessitates dynamic network control.

A naive dynamic control policy would re-optimize the entire model whenever changes of demands are observed. In view of the operational costs associated with implementing the reprovisioning on the network and the computational effort and time needed for such re-optimizations, this approach is excessive and wasteful. For example, wavelength capacity typically comes in large bundles and lumpy costs. So provisioning the network involves changing capacities in large increments, and thus is not justified for relatively small demand changes. In addition, since many of the demand changes are instantaneous and random, it will be costly and disruptive to provision the network in reaction to each of these changes.

On the other hand, it is also inefficient to let network management be oblivious to demand changes. Routing and admission decisions can be fine-tuned rapidly to accommodate small changes in demands. However, provisioning decisions need to be reexamined when demand changes are sufficiently large and persistent.

The time scale separation approach disclosed herein provides an efficient solution. Network management optimizations such as adjustment of routing and admission control occur on a fast time scale in response to small changes of demands, and network provisioning optimizations such as resizing of paths are performed on a slow time scale as triggered by results of the network management optimizations. Importantly, this feature of time scale separation maps into the aforementioned decomposition of the optimization model. The shadow costs of the paths, which are an outcome of the solution procedure for the slave problem, are used to trigger network provisioning optimization.

An exemplary control algorithm with time scale separation can be derived from the solution to the slave problem.

Referring to (8), $$G(\vec{z}) = \max_{\vec{x}, \vec{w}} \left[ U(\vec{w}) \Big| \sum_{r \in R: p \in r} x_r \le b z_p, \sum_{r \in R(\xi)} x_r = w_\xi \le D_\xi \right] \quad (10)$$

$$= \min_{\vec{\lambda}} \left\{ \max_{\vec{x}, \vec{w}} \left[ U(\vec{w}) + \vec{\lambda}'(\vec{z} - B\vec{x}) \Big| \sum_{r \in R(\xi)} x_r = w_\xi \le D_\xi \right] \right\},$$

where $\vec{\lambda} = \{\lambda_p, p \in P\}$ are the Lagrange multipliers associated with the path capacity constraints. The Lagrange multipliers are examples of what are more generally referred to herein as shadow costs. These multipliers represent marginal values to the utility of carrying traffic from the capacities of the optical lightpaths.

For given $\vec{z}$, the optimal solution to the slave problem is given by $$G(\vec{z}) = U(\vec{w}^*) + \vec{\lambda}^*(\vec{z} - B\vec{x}^*) = U(\vec{w}^*) - \vec{\lambda}^* B\vec{x}^* + \vec{\lambda}^* \vec{z} \quad (11)$$
$$= \Gamma^* + \vec{\lambda}^* \vec{z},$$

where $\Gamma^* = U(\vec{w}^*) - \vec{\lambda}^* B \vec{x}^*$.

Incorporating (11) into the master problem (9), the optimal value of $\vec{z}$ maximizes $$\Gamma^*(\vec{z}) + \vec{\lambda}^*(\vec{z})\vec{z} - \sum_{p \in P} c_p z_p. \quad (12)$$

Therefore, for different instances of the slave problem, i.e., given different values of the traffic demand, $D_\xi$, as inputs, the optimal choice of $\vec{z}$ should stay the same, if $\Gamma^*(\vec{z})$ and $\vec{\lambda}^*(\vec{z})$ stay constant.

The dynamic network control algorithm is built upon this principle, i.e., if the demand changes are not substantial and persistent enough to cause a sufficiently large change in $\lambda(\vec{z}^*)$, where $\lambda(\vec{z}^*)$ are the Lagrange multipliers at the optimal values of $\vec{z}$, then there is no need to reprovision the network. This leads to the time scale separation of the network control algorithm: re-optimize routing and admission control on a fast time scale, monitor the network by observing shadow costs, and re-optimize the provisioning only when the monitoring routine deems it necessary.

Based on the time scale separation principle, the following procedure is used for dynamic network control in the present example.

1. Time is divided into small intervals (short time scale) and the slave problem is solved in each interval. This gives the optimal routing and admission control for given path configuration and for the demands that materialize in that interval. The solution procedure also yields the shadow costs for each path.

2. As demands fluctuate, so do the shadow costs. Given the time trajectory of shadow costs, the decision is made as to whether the change is systematic and significant. Let $\vec{\lambda}^0$ be the shadow costs at time at the most recent time of optimization, and $g^k(\vec{\lambda})$ be the estimate of shadow costs based on their observations $\vec{\lambda}^1, \vec{\lambda}^2, \ldots, \vec{\lambda}^k$ since the last re-optimization. A threshold function is defined as $\phi(|g^k(\vec{\lambda}) - (\vec{\lambda}^0)|)$ and the re-optimization is triggered when $$\phi(|g^k(\vec{\lambda} - \vec{\lambda}^0)|) \geq \delta c \quad (13)$$

i.e., when the change of shadow costs exceeds some threshold relative to some fraction of wavelength deployment costs.

3. A systematic and significant change in the shadow costs indicates that a re-optimization of the sizing in the virtual topology is warranted. For example, changes to the numbers of wavelengths deployed on paths of the virtual network may be made. The re-optimization gives the new configuration of the core optical network (long time scale), which persists until the next trigger.

The basic model (1) falls into the category of nonlinear integer programming optimization. The approach described above is sufficiently general that it does not need to be confined to a specific optimization procedure. Nevertheless, Generalized Bender's Decomposition as noted above can be used to provide a solution. Specifically, the following iterative procedure is performed: Define $\Gamma \equiv U(\vec{w}^*) - \Sigma_{p \in P} B_p \vec{x}^*$ as the starting utility, and use $$G(\vec{z}) = \Gamma + \sum_{p \in P} \lambda_p z_p \quad (14)$$

as the linear approximation of the utility function. The master problem is then transformed into $$\max_{\gamma, \vec{z}} \left[ \gamma - \sum_{p \in P} c_p z_p \middle| \gamma \leq \Gamma + \sum_{p \in P} \lambda_p z_p, \sum_{p \in P: l \in p} z_p \leq f_l, \forall l \in L z_p \text{ integral} \right]. \quad (15)$$

At each iteration, first solve the slave problem to generate $\Gamma$ and $\vec{\lambda}$, which are used to construct a new instance of the constraint $$\gamma \leq \Gamma + \sum_{p \in P} \lambda_p z_p,$$

to augment those generated in the previous iterations. The process stops when adding a new constraint no longer changes the solution. As mentioned above, numerous alternative optimization models and corresponding solution procedures can be used in implementing the present invention.

It should also be noted that various representations of network topology and routing information may be used in conjunction with a given implementation of network management and provisioning optimizations. For example, the above-noted virtual network topology may specify a link to path mapping that is defined by a matrix A. A given element of the matrix A, denoted $A_{lp}$, may be specified as follows:

$A_{lp} = 1$ if link $l$ is on path $p$ $A_{lp} = 0$ otherwise

Similarly, the network routing may specify a path to route mapping defined by a matrix B. A given element of the matrix B, denoted $B_{pr}$, may be specified as follows:

$B_{pr} = 1$ if path $p$ is on route $r$ $B_{pr} = 0$ otherwise

Optimizations in this example may be performed relative to previously-described constraints such as the number $z_p$ of wavelengths on path p, the maximum number $f_l$ of wavelengths on link l, and the data rate $x_r$ on route r. These constraints as applied to the A and B matrices lead to the following equations:

$A\underline{z} \leq \underline{f}$ $B\underline{x} \leq \underline{z}$ where $\underline{z}$, $\underline{f}$ and $\underline{x}$ denote vectors of the above-noted constraint values. Parameters in this example may include the incremental cost $c_p$ of wavelength on path p, traffic demands D, which may comprise a demand matrix or matrix of demand functions, etc.

Again, it is to be appreciated that the particular assumptions, configurations and other characteristics of the illustrative embodiments described above are presented by way of example only. Accordingly, the particular network and controller configurations shown in FIGS. 1 and 2 and the time scale separation and associated optimization process shown in FIGS. 3 and 4 may be altered in other embodiments. Also, a wide variety of other network management and provisioning optimizations may be used in implementing the invention. These and numerous other alternative embodiments within the scope of the appended claims will be readily apparent to those skilled in the art.

What is claimed is:

1. A method of configuring a network, the method comprising the steps of:
    performing network management optimizations at respective points in time separated by intervals of a first time scale;
    performing network provisioning optimizations at respective points in time separated by intervals of a second time scale, the intervals of the second time scale being on average substantially longer than the intervals of the first time scale; and
    configuring the network utilizing information specified by the network management and network provisioning optimizations;
    wherein a given one of the intervals of the second time scale has a length which is determined based on results of performance of one or more of the network management optimizations; and
    wherein the steps of performing network management optimizations, performing network provisioning optimizations and configuring the network are implemented under control of a network device comprising a processor coupled to a memory.

2. The method of claim 1 wherein the network comprises a core optical network of a communication network comprising multiple data networks coupled to the core optical network, and wherein the network management optimizations and the network provisioning optimizations are performed in the core optical network.

3. The method of claim 1 wherein the network management optimizations comprise at least one of a routing optimization and an admission control optimization.

4. The method of claim 1 wherein the network provisioning optimizations comprise a path resizing optimization.

5. The method of claim 1 wherein the intervals of the first time scale comprise fixed length time intervals.

6. The method of claim 1 wherein the intervals of the second time scale comprise variable length time intervals having lengths which are determined based on outputs generated by the network management optimizations.

7. The method of claim 1 wherein the network management optimizations are performed at respective points in time denoted by a first index, the network provisioning optimizations are performed at respective points in time denoted by a second index, and the first index of the points at which network management optimizations are performed is reset to an initial value at each point denoted by a value of the second index at which a network provisioning optimization is performed.

8. The method of claim 7 wherein the network management optimization performed at a given point denoted by an initial value of the first index is performed jointly with the network provisioning optimization performed at a corresponding point denoted by a value of the second index.

9. The method of claim 8 wherein a joint network management optimization and network provisioning optimization receives as input a set of traffic demands, and optimizes an objective function given by a maximum difference in a common measurement system between utility of carrying traffic and wavelength cost, generating as outputs values for number of wavelengths on each of a plurality of paths of the network, amount of traffic carried on each of a plurality of routes of the network, and shadow costs for each of the paths.

10. The method of claim 9 wherein the network management optimization performed at a point denoted by a non-initial value of the first index receives as input a set of traffic demands, and maximizes the utility of carrying traffic subject to a constraint given by the number of wavelengths on each of the paths, generating as outputs values for amount of traffic carried on each of the routes, and shadow costs for each of the paths.

11. The method of claim 7 wherein a trigger decision as to whether or not a network provisioning optimization is to be performed is made based on cost measures as determined in one or more of the network management optimizations.

12. The method of claim 11 wherein if the trigger decision indicates that a network provisioning optimization is to be performed, the first index is reset to the initial value, the second index is incremented, and the network provisioning optimization is performed jointly with a network management optimization.

13. The method of claim 1 wherein the network management optimization and network provisioning optimization comprise solutions to respective slave and master problems derived from a single optimization model.

14. The method of claim 13 wherein the optimization model incorporates a measure of utility of carrying traffic and a measure of wavelength cost, and is subject to a constraint on maximum number of wavelengths on each of a plurality of links in the network.

15. The method of claim 1 wherein the network management and network provisioning optimizations are implemented at least in part in software running on a processing element of the network.

16. An article of manufacture comprising a processor-readable storage medium storing one or more software programs which when executed by a processor perform the steps of the method of claim 1.

17. An apparatus for use in configuring a network, the apparatus comprising:
    a controller having at least one processor, the processor being coupled to a memory;
    wherein the controller is operative to control the performance of network management optimizations at respective points in time separated by intervals of a first time scale, and the performance of network provisioning optimizations at respective points in time separated by intervals of a second time scale, the intervals of the second time scale being on average substantially longer than the intervals of the first time scale;
    wherein the network is configured utilizing information specified by the network management and network provisioning optimizations; and
    wherein a given one of the intervals of the second time scale has a length which is determined based on results of performance of one or more of the network management optimizations.

18. A communication network comprising:
one or more data networks; and
a core optical network coupled to the one or more data networks;
the core optical network comprising a plurality of optical switching nodes and an associated controller;
wherein the controller is operative to control the performance of network management optimizations at respective points in time separated by intervals of a first time scale, and the performance of network provisioning optimizations at respective points in time separated by intervals of a second time scale, the intervals of the second time scale being on average substantially longer than the intervals of the first time scale;
wherein the network is configured utilizing information specified by the network management and network provisioning optimizations; and
wherein a given one of the intervals of the second time scale has a length which is determined based on results of performance of one or more of the network management optimizations.

19. The communication network of claim 18 wherein the controller comprises a centralized controller.

20. The communication network of claim 18 wherein the controller comprises a distributed controller.

21. The apparatus of claim 17 wherein the network comprises a core optical network of a communication network comprising multiple data networks coupled to the core optical network, and wherein the network management optimizations and the network provisioning optimizations are performed in the core optical network.

22. The apparatus of claim 17 wherein the network management optimizations comprise at least one of a routing optimization and an admission control optimization.

23. The apparatus of claim 17 wherein the network provisioning optimizations comprise a path resizing optimization.

24. The apparatus of claim 17 wherein the intervals of the first time scale comprise fixed length time intervals.

25. The apparatus of claim 17 wherein the intervals of the second time scale comprise variable length time intervals having lengths which are determined based on outputs generated by the network management optimizations.

26. The apparatus of claim 17 wherein the network management optimizations are performed at respective points in time denoted by a first index, the network provisioning optimizations are performed at respective points in time denoted by a second index, and the first index of the points at which network management optimizations are performed is reset to an initial value at each point denoted by a value of the second index at which a network provisioning optimization is performed.

27. The apparatus of claim 17 wherein the network management optimization and network provisioning optimization comprise solutions to respective slave and master problems derived from a single optimization model.

* * * * *

UNITED STATES PATENT AND TRADEMARK OFFICE
CERTIFICATE OF CORRECTION

| | | |
|---|---|---|
| PATENT NO. | : 8,953,938 B2 | Page 1 of 2 |
| APPLICATION NO. | : 11/679515 | |
| DATED | : February 10, 2015 | |
| INVENTOR(S) | : D. Mitra et al. | |

It is certified that error appears in the above-identified patent and that said Letters Patent is hereby corrected as shown below:

In the Specification

Column 3, line 33, please change "an core" to --a core--

Column 4, line 50, please change "202" to --204--

Column 6, line 58, please change "(D)" to --(D̲)--

Column 6, line 65, please change "(z)" to --(z̲)--

Column 6, line 65, please change "(x)" to --(x̲)--

Column 6, line 65, please change "(z)" to --(z̲)--

Column 6, line 66, please change "(λ)" to --(λ̲)--

Column 7, line 15, please change "(z)" to --(z̲)--

Column 7, line 18, please change "(D)" to --(D̲)--

Column 7, line 22, please change "(z)" to --(z̲)--

Column 7, line 23, please change "(x)" to --(x̲)--

Column 7, line 24, please change "(λ)" to --(λ̲)--

Column 7, line 27, please change "(λ)" to --(λ̲)--

Column 7, line 43, please change "possible" to --possibly--

Signed and Sealed this
Twelfth Day of May, 2015

Michelle K. Lee
*Director of the United States Patent and Trademark Office*

CERTIFICATE OF CORRECTION (continued)
U.S. Pat. No. 8,953,938 B2

Column 9, lines 29 - 44, should read, $$\max_{\vec{z},\vec{w},\vec{x}} \{U(\vec{w}) - \sum_{p \in P} c_p z_p | \sum_{r \in R: p \in r} x_r \leq b z_p, \sum_{r \in R(\xi)} x_r = w_\xi \leq D_\xi,$$

$$\sum_{p \in P: l \in p} z_p \leq f_l, \forall l \in L\}. \tag{6}$$

$$= \max_{\vec{z}}[\max_{\vec{x},\vec{w}} \{U(\vec{w})| \sum_{r \in R: p \in r} x_r \leq b z_p, \sum_{r \in R(\xi)} x_r = w_\xi\}$$

$$- \sum_{p \in P} c_p z_p | \sum_{p \in P: l \in p} z_p \leq f_l, \forall l \in L].$$

$$= \max_{\vec{z}} \{G(\vec{z}) - \sum_{p \in P} c_p z_p | \sum_{p \in P: l \in p} z_p \leq f_l, \forall l \in L\}. \tag{7}$$

Column 13, line 1, please change "(D)" to --($\underline{D}$)--